Patented Sept. 15, 1942

2,295,884

UNITED STATES PATENT OFFICE 2,295,884

P-SUBSTITUTED - BENZENESULPHONYL BIGUANIDES AND METHODS FOR THEIR PREPARATION

Philip Stanley Winnek, Riverside, Conn., assignor to American Cyanamid Company, New York, N. Y., a corporation of Maine No Drawing. Application February 24, 1941, Serial No. 380,336

14 Claims. (Cl. 260—397.7)

The present invention relates to a new class of chemical compounds and methods for their preparation. More particularly it relates to p-substituted-benzenesulphonyl biguanides and methods for their preparation.

This new class of compounds are those represented by the following general formula:

in which X represents an amino or a substituted amino radical, such as alkylamino, aralkylamino, arylamino, hydroxylamino, aldose amino, sodium formaldehyde sulphoxalate amino, and the like, or a radical which can be reduced to an amino group, including nitro and azo radicals and acylamino radicals which can be converted to an amino group by hydrolysis, and B represents biguanide or a substituted biguanide radical. The invention also includes acid salts of the compounds represented by the above general formula.

The compounds of this invention are useful as intermediates for the production of azo dyes and pharmaceuticals. Some of the compounds may be useful as chemotherapeutic agents themselves since it is known that sulphanilyl guanidine does possess therapeutic activity, and the compounds of the present invention have some similar physical and chemical properties.

In general the compounds of the present invention may be prepared by reacting a p-X-benzenesulphonyl halide with a biguanide having an active —NH₂ group, in which X represents an acylamino group, such as acetylamino, which can be hydrolyzed to an amino group, or a nitro or azo group which can be reduced to an amino group, and it is therefore apparent that X may be an amino group produced by either of the above described processes.

The methods for preparation of the compounds of this invention will be specifically illustrated in the following examples. It should be understood, however, that the examples are merely illustrative of the preferred methods of preparing representative compounds of the class and are not intended to limit the scope of the invention. The parts are by weight except in the case of liquids which are expressed in corresponding parts by volume.

EXAMPLE 1

*p-Nitrobenzenesulphonyl biguanide*

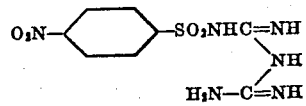

20 parts of biguanide are suspended in 125 parts of acetone. The mixture is cooled to 15° C. and 23 parts of p-nitrobenzenesulphonyl chloride are added gradually with vigorous stirring and with the temperature kept between 15° and 20° C. The mixture is stirred for one hour. The yellow precipitate of crude p-nitrobenzenesulphonyl biguanide which forms is then filtered off and purified by crystallization from acetic acid. The product so obtained can readily be converted to the p-amino compound by iron reduction.

EXAMPLE 2

*N⁴-acetylsulphanilyl biguanide*

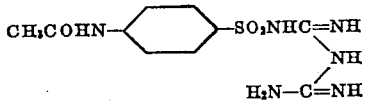

20 parts of biguanide are suspended in 125 parts of acetone. The mixture is cooled to 15° C. and 25 parts of N-acetylsulphanilyl chloride are added gradually with vigorous stirring and with the temperature maintained between 15° and 20° C. The mixture is stirred for one hour. The almost white precipitate of crude N-acetylsulphanilyl biguanide which forms is filtered off and purified by crystallization from hot water.

EXAMPLE 3

*Sulphanilyl biguanide*

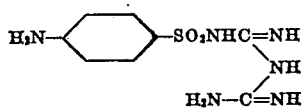

16 parts of N⁴-acetylsulphanilyl biguanide are dissolved in 96 parts of 4 N hydrochloric acid and the solution is boiled ten minutes. 200 parts of ice are then added and the resulting cold solution is neutralized with sodium hydroxide solution. The crude sulphanilyl biguanide which separates is filtered off and purified by crystallization from hot water.

Example 4

*N⁴-acetylsulphanilylbutyl biguanide*

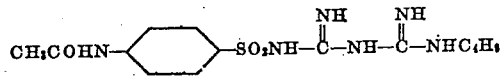

10 parts of butyl biguanide hydrochloride are suspended in 60 parts of acetone and 5 parts of sodium hydroxide dissolved in 15 parts of water are added. The mixture is cooled to 15° C. and 13 parts of acetylsulphanilyl chloride are added gradually with stirring, keeping the temperature between 15° and 20° C. Stirring is continued for one hour at room temperature and the mixture is then warmed to 45° C. for fifteen minutes. It is then cooled and ice is added. The N⁴-acetylsulphanilylbutyl biguanide separates as a gummy precipitate which on standing with water turns to a light yellow solid.

Example 5

*Sulphanilyl butyl biguanide*

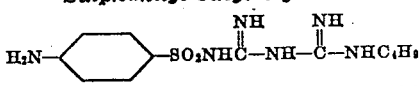

5.5 parts of N⁴-acetylsulphanilyl butyl biguanide are suspended in 15 parts of 4 N hydrochloric acid and the mixture is heated to boiling. The solid material soon dissolves and the solution is boiled gently for five minutes. It is then diluted with an equal volume of ice and the cold solution is stirred for fifteen minutes with decolorizing charcoal. It is filtered and the filtrate neutralized in the cold with sodium hydroxide. The crude sulphanilyl butyl biguanide separates as a tarry material which on standing turns to a solid. It is purified by crystallization from methanol using decolorizing charcoal to remove color. The final product is a white crystalline material.

Example 6

*N⁴-acetylsulphanilyl dimethyl biguanide*

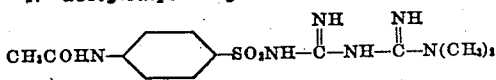

7 parts of 1,1-dimethyl biguanide hydrochloride are suspended in 50 parts of acetone and 4.2 parts of sodium hydroxide dissolved in 12 parts of water are added. The mixture is cooled to 20° C. and 10 parts of acetylsulphfanilyl chloride are added gradually with stirring and with the temperature kept between 18° C. and 23° C. The mixture is stirred at room temperature for several hours and allowed to stand for fourteen hours. The N⁴-acetylsulphanilyl dimethyl biguanide which separates from the reaction mixture is filtered off and is obtained as a light colored solid.

Example 7

*Sulphanilyl dimethyl biguanide*

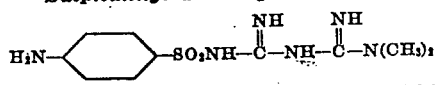

9 parts of N⁴-acetylsulphanilyl dimethyl biguanide are suspended in 21 parts of 4 N hydrochloric acid and boiled gently for five minutes. The resulting solution is diluted with an equal volume of ice and stirred for one-half hour with decolorizing charcoal. It is filtered and the filtrate neutralized in the cold with sodium hydroxide solution. The sulphanilyl dimethyl biguanide separates as a white solid. It is purified by crystallization from an alcohol-water solution.

Example 8

*N⁴-acetylsulphanilyl-o-tolyl biguanide*

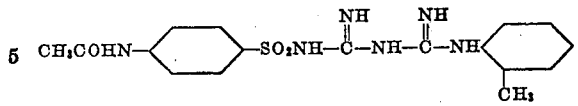

2 parts of o-tolyl biguanide are suspended in 10 parts of acetone and 0.6 part of sodium hydroxide dissolved in 2 parts of water are added. The mixture is cooled to 15° C. and 2.5 parts of acetylsulphanilyl chloride are added gradually with stirring and with the temperature kept between 15° and 20° C. The mixture is stirred for one hour at room temperature and is then warmed slightly until most of the acetone has evaporated. Water is then added and the mixture is neutralized with acetic acid. The N⁴-acetylsulphanilyl-o-tolyl biguanide separates as a tarry material which turns solid on standing in the cold with water.

Example 9

*Sulphanilyl-o-tolyl biguanide*

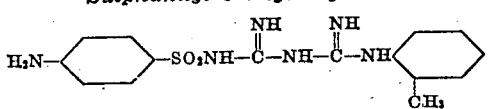

2 parts of N⁴-acetylsulphanilyl-o-tolyl biguanide are suspended in a mixture of 20 parts of ethanol and 4 parts of concentrated hydrochloric acid. The mixture is heated to boiling and is boiled gently for one-half hour, water being added from time to time to maintain the volume. The resulting solution is cooled and neutralized with sodium hydroxide solution. The sulphanilyl-o-tolyl biguanide separates as a tarry material which solidifies on standing in the cold. It is purified by crystallization from an alcohol-water solution using decolorizing charcoal to remove impurities.

Example 10

*N⁴-Acetylsulphanilyl biguanylmorpholine*

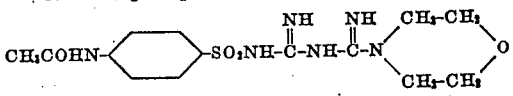

5.2 parts of biguanyl morpholine hydrochloride are suspended in 30 parts of acetone and 2.5 parts of sodium hydroxide dissolved in 7 parts of water are added. The mixture is cooled to 20° C. and 6.5 parts of acetylsulphanilyl chloride are added gradually with stirring and with the temperature kept between 18° and 23° C. The mixture is stirred for five hours and 150 parts of water are added and the mixture is neutralized with acetic acid and allowed to stand in the ice box for sixteen hours. The N⁴-acetylsulphonilyl biguanyl morpholine separates as a yellow solid. It may be purified by crystallization from hot water using decolorizing charcoal to remove impurities.

Example 11

*Sulphanilyl biguanyl morpholine*

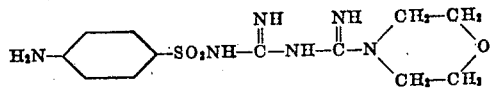

4 parts of N⁴-acetylsulphanilyl biguanyl morpholine are suspended in 9 parts of 4 N hydrochloric acid and the mixture is boiled for five minutes. The resulting solution is diluted with an equal volume of ice and the cold solution is stirred for one-half hour with decolorizing charcoal. It is filtered and the filtrate is neutralized with sodium hydroxide solution in the cold. The crude sulphanilyl biguanyl morpholine separates as a tarry material which on warming with water turns to a yellow solid. It is purified by crystallization from water using decolorizing charcoal to remove impurities.

In the above examples the p-acetylaminobenzenesulphonyl chloride was used in carrying out the reactions. The acetyl compound is preferred because of its cheapness and availability; however, it is to be understood that other acyl compounds may be used, including those such as propionyl, butyryl, deconyl, benzoyl, furoyl, nicotinyl, and the like. Similarly, instead of p-acetylaminobenzenesulphonyl chloride the corresponding p-acetylaminobenzenesulphonyl bromide or other halide may be used.

In the foregoing examples certain specific alkyl, aryl, and heterocyclic substituted biguanides have been used in carrying out the reactions. These substituted biguanides may be replaced by any other substituted biguanide containing an aliphatic, alicyclic, aliphatic heterocyclic, aromatic, heterocyclic, or other substituent group as long as the biguanide also contains an active —$NH_2$ group which will react with sulphonyl chloride to split off HCl.

Arylamino, alkylamino, aralkylamino, alicyclicamino, monoaldoseamino, hydroxylamino, sodium formaldehyde sulphoxalate amino, and similar derivatives of the p-amino compounds illustrated in the examples may be prepared by known methods, such as by the use of an acyl, alkyl, aralkyl halide, a monoaldose sugar such as for example glucose, etc.

The structural formulae given in the examples are probably correct; however, this has not definitely been proven and the invention is not to be limited to the compounds having those structural formulae for it is entirely possible that the biguanide radical may couple to the $SO_2$ radical in a manner different from that illustrated. As for example, linkages may be as follows:

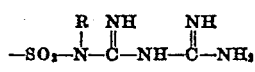

or

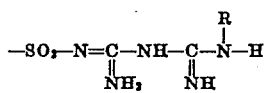

in which R represents hydrogen or one of the substituent groups mentioned in the specification heretofore.

Neither is the present invention limited to any particular method for preparing the salts of the p-aminobenzenesulphonyl biguanides. They will combine with any inorganic or organic acid and form salts therewith. The ordinary inorganic salts, such as the hydrochlorides, sulphates, phosphates, chlorates, and the like, may be prepared by adding the p-amino compound to a relatively strong aqueous solution of the acid. A salt produced by the reaction may be very conveniently recovered by diluting the aqueous solution with an organic solvent such as acetone and recovering the resulting precipitate by filtration. The salts of the water soluble organic acids, such as for example, acetic, lactic, citric, and the like, may be prepared as described in the process above. Another suitable method for preparing the salts comprises a method in which a relatively water insoluble organic acid, such as benzoic, is dissolved in an organic solvent, for example ethyl alcohol, and the p-amino compound added to this solution, in which case the salt may be recovered by any convenient means as for example by evaporating the solution to dryness. Still another method for preparing salts in accordance with the present invention comprises a process in which p-aminobenzenesulphonyl biguanide hydrochloride, preferably in the form of an aqueous solution, is reacted with substantially one molecular proportion of the sodium salt of an organic acid, for example, sodium phthalate, also preferably in aqueous solution and the acid salt separated from the sodium chloride.

It is readily seen, therefore, that the present invention relates to and includes any inorganic acid salt. Similarly this invention includes any organic acid salt of p-aminobenzenesulphonyl biguanide including the saturated and unsaturated hydroxy, halogenated or other substituted acids of the aliphatic, alicyclic, aromatic, and heterocyclic series. Preferably the salts are those produced from relatively non-toxic organic acids or those having some bactericidal or other therapeutic property, including acids such as acetic, salicyclic, mandelic, lactic, and the like.

The above description and examples are intended to be illustrative only. Any modification of or variation therefrom which conforms to the spirit of the invention is intended to be included in the scope of the claims.

What I claim is:

1. A compound of the group consisting of those represented by the following general formula and inorganic and carboxylic acid salts thereof:

in which X is a member of the group consisting of amino radicals, radicals hydrolyzable to an amino group and radicals reducible to an amino group, and B represents a biguanide radical.

2. The compounds represented by the following general formula:

in which Y is a group capable of being hydrolyzed to an amino group, and B represents a biguanide radical.

3. The compounds represented by the following general formula:

in which Z represents a group capable of being reduced to an amino group and B represents a biguanide radical.

4. The compounds represented by the following general formula:

in which B represents a biguanide radical.

5. The compounds represented by the following general formula:

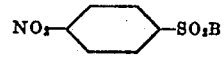

in which B represents a biguanide radical.

6. The compounds represented by the following general formula:

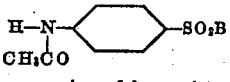

in which B represents a biguanide radical.

7. The compound p-nitrobenzenesulphonyl biguanide.

8. The compound $N^4$-acetylsulphanilyl biguanide.

9. The compound sulphanilyl biguanide.

10. The process which comprises reacting a biguanide with a p-nitrobenzenesulphonyl halide and subjecting the reaction product to a reduction treatment converting the nitro group to an amino group.

11. The process which comprises reacting a biguanide with a p-acetylaminobenzenesulphonyl halide and subjecting the reaction product to a hydrolysis treatment to remove the acetyl group.

12. The process of producing p-aminobenzenesulphonyl biguanide which comprises reacting biguanide with p-acetylaminobenzenesulphonyl chloride and hydrolyzing the resulting acetyl compound to the amino compound.

13. The process of producing p-aminobenzenesulphonyl biguanide which comprises reacting biguanide with p-nitrobenzenesulphonyl chloride and reducing the resulting nitro compound to the amino compound.

14. The process of producing p-substituted benzenesulphonyl biguanide compounds which comprises reacting a p-X-benzene-$SO_2$-halogen with a biguanide in which X is a member of the group consisting of radicals hydrolyzable to an amino group and radicals reducible to an amino group.

PHILIP STANLEY WINNEK.

CERTIFICATE OF CORRECTION.

Patent No. 2,295,884. September 15, 1942.

PHILIP STANLEY WINNEK.

It is hereby certified that error appears in the printed specification of the above numbered patent requiring correction as follows: Page 2, second column, line 59, for "$N^4$-acetylsulphonilyl" read --$N^4$-acetylsulphanilyl--; page 3, second column, line 41, claim 1, for "amina" read --amino--; and that the said Letters Patent should be read with this correction therein that the same may conform to the record of the case in the Patent Office.

Signed and sealed this 20th day of October, A. D. 1942.

(Seal)

Henry Van Arsdale,
Acting Commissioner of Patents.